(12) United States Patent
Brotherton et al.

(10) Patent No.: US 6,666,309 B2
(45) Date of Patent: Dec. 23, 2003

(54) TRUCK BRAKE DRUM

(75) Inventors: Joseph A. Brotherton, Portland, OR (US); Brian T. Young, Vancouver, WA (US)

(73) Assignee: Consolidated Metco Incorporated, Portland, OR (US)

( * ) Notice: Subject to any disclaimer, the term of this patent is extended or adjusted under 35 U.S.C. 154(b) by 0 days.

(21) Appl. No.: 09/839,921

(22) Filed: Apr. 23, 2001

(65) Prior Publication Data

US 2002/0153211 A1 Oct. 24, 2002

(51) Int. Cl.[7] .................................................. F16D 65/10
(52) U.S. Cl. .................. 188/218 R; 188/71.6; 188/264 A
(58) Field of Search ................ 188/218 R, 74, 188/18 A, 71.6, 78, 325, 264 A, 264 R

(56) References Cited

U.S. PATENT DOCUMENTS

| | | | | |
|---|---|---|---|---|
| 3,003,598 A | * | 10/1961 | Sumner et al. | 188/218 R |
| 3,583,533 A | * | 6/1971 | Jones et al. | 188/218 R |
| 4,830,150 A | * | 5/1989 | Denton | 188/218 R |
| 5,383,537 A | * | 1/1995 | White | 188/78 |
| 5,823,304 A | * | 10/1998 | Wagg | 188/218 R |

* cited by examiner

*Primary Examiner*—Pam Rodriguez
(74) *Attorney, Agent, or Firm*—Edward J. Brosius

(57) ABSTRACT

A brake drum is provided that includes an open end and a hub end, with a braking section extending generally transversely from the open end to join with the hub end. A plurality of first-indented sections are present on an outer surface of the braking section. A transition section extends from the braking section to the hub end. A plurality of second indented sections are located on an outer surface of the transition section. A plurality of third-indented sections or openings can be present in the hub end between wheel lug openings.

22 Claims, 4 Drawing Sheets

TRUCK BRAKE DRUM

BACKGROUND OF THE INVENTION

Heavy duty brake drums for trucks are typically made of cast iron. Brake drums are generally of a cylindrical cup shape, having a full diameter open end designed to be placed around the brake pads. A hub end is opposite the open end and is designed with a centrally located opening to receive the wheel hub therethrough. A portion of the hub end includes the wheel lug openings.

Certain problems with such cast iron brake drums include the relatively high weight necessary for proper strength together with the need for thermal performance in the form of heat dissipation from the braking due to the contact of the brake shoes with the interior braking surface of the drum.

One focus of prior art drums has been the addition of axial ribs on the outer surface of the braking section of the drum to provide better heat dissipation and thermal performance for the brake drum. Such an arrangement is shown in U.S. Pat. No. 5,826,684. Such rib addition is undesirable as it adds material and, accordingly, weight to the brake drum, as well as creating possible clearance problems for the outer surface of the brake drum as part of the truck wheel assembly itself. Further, in ordinary iron foundry practice, it requires a more complex mold to produce a drum having external ribs and, accordingly, leads to a more expensive product to cast and finish.

While it is desirable to decrease the weight of the brake drum, concern remains for the overall strength of the drum. It is desirable, accordingly, to produce a brake drum that has as light a weight as possible, but yet provides adequate strength for the heavy-duty service to which a truck brake drum is exposed. Further, it is desirable to increase the surface area of the drum in a manner to facilitate thermal performance and cooling, without unduly decreasing the strength or service life of the brake drum.

Accordingly, it is an object of the present invention to provide a lighter weight brake drum with improved thermal performance characteristics.

It is another object of the present invention to provide a lighter weight brake drum that has adequate strength to provide good service life in a heavy-duty truck application.

SUMMARY OF THE INVENTION

The present invention provides a generally cylindrical brake drum having an open end and a hub end, with a braking section extending from the open end toward the hub end. The hub end is partially closed to form a hub receiving opening in a generally flat, radially central portion of the hub end. The transition section extends from the braking section to an intersection with the hub end. The hub end flat circular section includes a plurality of wheel lug openings extending therethrough.

The drum is usually comprised of cast iron, and the brake drum itself is manufactured in a foundry casting operation. Various finishing operations are required to complete the as-cast brake drum which include a machining of the interior surface of the braking section to form a circular smooth surface to facilitate contact with the brake shoes themselves. Further, the flange edges and raised squealer balancing band are also machined.

As part of the present invention, a plurality of first-indented sections is provided on the outer surface of the braking section. Such indented sections are usually formed during the casting operation itself by appropriate corresponding protrusions on a mold. The first-indented sections extend from a location generally near the open end or near or to the squealer balancing band at the open end along the outer surface of the braking section to and, possibly, onto the transition section. The shape of such indented sections is usually quadrilateral, but can include ovals or combinations of curved and straight section intersections.

A plurality of second-indented sections appears on an outer surface of the transition section. Such second-indented sections are generally triangular in shape, but, of course, could be of an oval or quadrilateral or a combined configuration as well. It is usual to locate each of the second-indented sections between two of the first-indented sections. Again, such second-indented sections are formed in the casting operation by appropriate protrusions from the mold that, accordingly, leave an indented section or absence of material in the actual cast brake drum itself.

A plurality of third-indented sections can be present on an inside surface or an outside surface of the hub end. Such third-indented sections are usually of a generally rectangular or quadrilateral shape, with consideration of foundry practice limitations requiring fillet corners. Further, each of the third-indented sections are usually located between two of the wheel lug openings in the circular flat surface of the hub end. Such third-indented sections can be in the form of openings that extend through the hub end.

DETAILED DESCRIPTION OF THE PREFERRED EMBODIMENT

Figure 1:
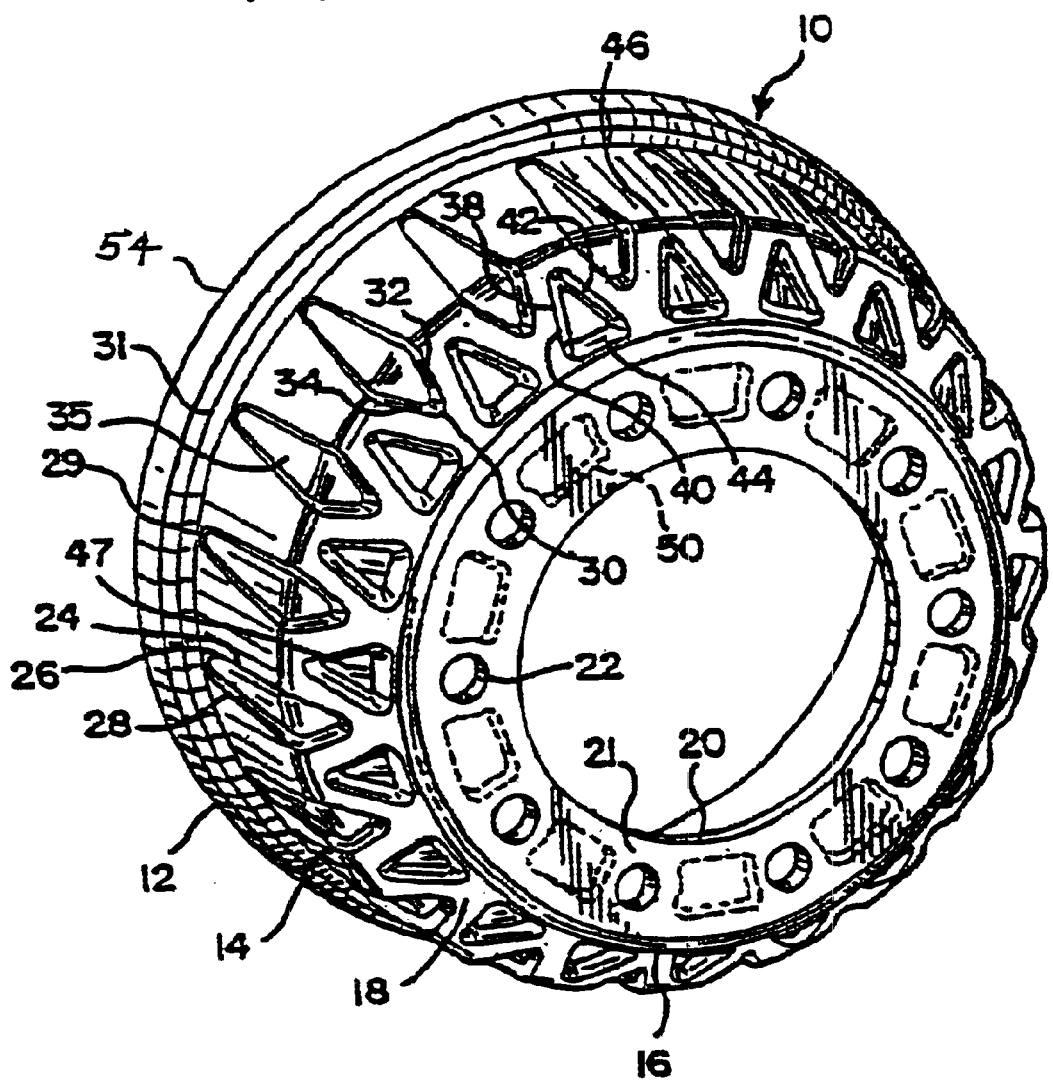
FIG. 1 is a perspective view of a brake drum in accordance with an embodiment of the present invention.
Figure 2:
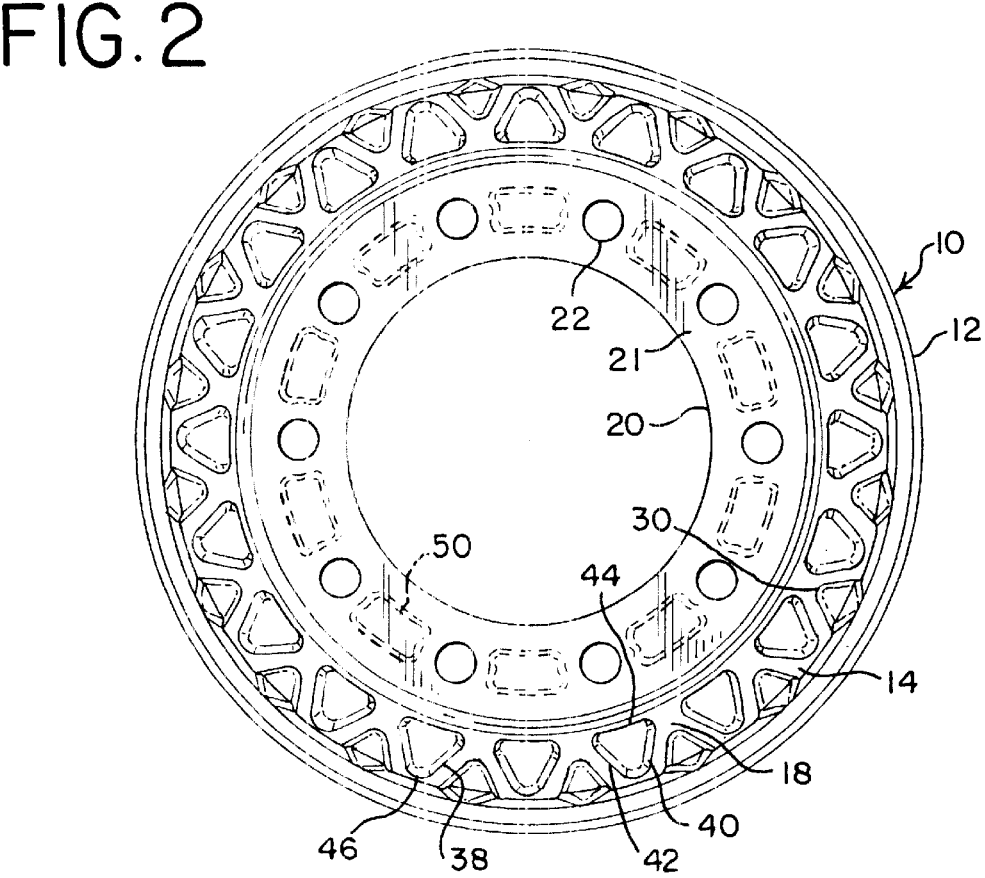
FIG. 2 is an end view of the hub end of the brake drum of FIG. 1.

Referring to FIGS. 1 and 2, a brake drum in accordance with an embodiment of the present invention is shown generally at 10. It is seen that brake drum 10 is a generally cylindrical structure, having a circular open end 12 and a nearly cylindrical braking section extending from open end 12 to hub end 16. Hub end 16 is seen to comprise a generally flat inner surface 21 that terminates by forming circular hub opening 20. A plurality of wheel lug openings 22 are spaced around inner surface 21 of hub end 16. In heavy-duty truck applications, the typical number of such wheel lug openings is eight or ten in total.

Transition section 18 is seen to extend from braking section 14 to inner surface 21 of hub end 16. Braking section 14 itself is a generally cylindrical section extending at a nearly normal relation to open end 12; however, it is also understood that a preferred embodiment of the present invention could have the outer surface of braking section 14 extending at a slightly less than normal angle to open end 12.

Figure 3:
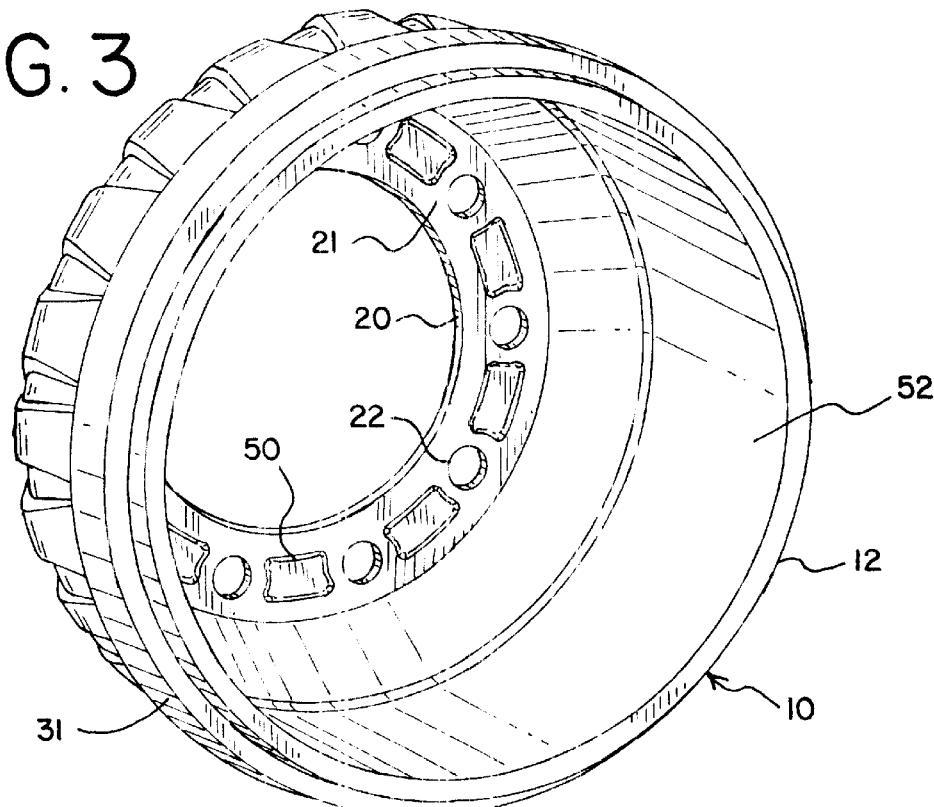
FIG. 3 is an end view of the open end of the brake drum of FIG. 1.

It should be understood that brake drum 10 is typically made of cast iron in a foundry operation. Accordingly, finishing machining operations are necessary prior to the final assembly of brake drum 10. Referring to FIG. 3, such machining would include the finishing of inner surface 52 of braking section 14 to assure a nearly perfect inner cylindrical surface. Such surface is necessary to accommodate the brake pads from the braking structure that brake drum 10 would surround. Further, the edges of open end 12 and squealer band 54 are machined.

It can be seen from FIGS. 1 and 2 that a plurality, most typically twenty, of first-indented sections 24 are present around the circumference of braking section 14. Each of first-indented sections 24 is seen to be comprised of an elongated quadrilateral shape, having first end 29 extending near open end 12 and a second end 30 extending on to transition section 18.

First end 29 of first-indented section 24 is comprised of a first side 26 and a second side 28 that extend at an angle with respect to each other of between 5 and 15 degrees. Further, second end 30 of first-indented section 24 is seen to comprise first side 32 and second side 34 which extend at an angle with respect to each other of between 65 and 80 degrees. Second end 30 of first-indented section 24 is seen to extend about 50 percent on to transition section 18.

It is known from foundry practice that first-indented section 24 would be formed by a complementary raised section in the mold used to cast brake drum 10. Accordingly, the shape of the angles and side surfaces of first-indented section 24 would be dependent on allowable foundry practice. Similarly, in accordance with allowable foundry practice, the thickness of interior surface 35 of first-indented section 24 would vary between 0.75 inches near first end 29 and 0.15 inches near second end 30. Due to strength concerns and foundry practice, the thickness of interior surface 35 would generally be about 0.7 inches. It can be seen that the thickness of interior surface 35 increases toward first end 29 of first indented section 24. It is also seen that first end 29 extends almost to squealer band 31, which is a raised circular section extending around open end 12 that is typically used for machining to balance brake drum 10.

A plurality of second-indented sections 38 is shown as spaced circumferentially around transition section 18. It is seen that each of second-indented sections 38 is comprised of a bottom edge 44 that extends to near the intersection of transition section 18 and inner surface 21 of hub end 16. Further, each of second-indented sections 38 also comprises a first side 40 and a second side 42. First side 40 and second side 42 extend at an angle with respect to each other of between 55 and 70 degrees. Accordingly, it is seen that each of second-indented sections 38 is generally triangular in shape, with bottom edge 44 being near inner surface 21 of hub end 16 and with end 46 of second-indented section 38 being near the intersection of transition section 18 and braking section 14.

Again, due to foundry practice and strength concerns for brake drum 10, the thickness of interior surface 47 second-indented section 38 is limited by foundry practice and strength concerns to a thickness of about 0.15 inches. Again, the edges and overall shape of second-indented section 38 is formed by a complementary extension of the mold used to cast brake drum 10; accordingly, the edges and overall shape of second-indented section 38 is restricted to good foundry practice.

It should here be understood that the overall elongated generally quadrilateral shape of first-indented section 24 is the preferred embodiment of the present invention. Other shapes such as elongated ovals are seen as being within the scope of the present invention, as would be a combination of rectilinear sides and curves. Further, the generally triangular shape of second-indented sections 38 is seen as a preferred embodiment of the present invention, whereas oval or other shapes of second-indented sections 38 are seen to be within the scope of the present invention. Likewise, a combination of rectilinear sides and curves is also possible. The overall circumferential spacing of first-indented sections 24 and second-indented sections 38 is such that such sections are alternated around braking section 14 and transition section 18. Similar spacing and circumferential location could be utilized with other shapes of first-indented section 24 and second-indented section 38. Further, it is within the scope of the present invention to eliminate or alternate certain of the first-indented sections 24 and second-indented sections 38.

Referring now to FIG. 3, a plurality of third-indented sections 50 is located on the interior-facing inner side of surface 21 of hub end 16. It is seen that each of third-indented sections 50 is generally quadrilateral in shape and each of third-indented sections in a preferred embodiment of the present invention is located between each of two wheel lug openings 22. It is also possible to eliminate certain of third-indented sections 50, but overall balancing of brake drum 10 is an important factor in considering the placement and configuration of third-indented sections 50, as is it for the placement and circumferential spacing of first-indented sections 24 and second-indented sections 38. Such balancing includes machining of the squealer band to achieve a static balance of brake drum 10. It is possible to eliminate certain of such sections, but the overall relationship and spacing about brake drum 10 is an important consideration with regard to balancing. It can be seen that in a preferred embodiment of the present invention, each of third-indented sections 50 could be spaced to within about 0.38 inches of each of wheel lug openings 22, keeping a certain spacing for the overall strength of brake drum 10 and in consideration of good foundry practice. Further, the thickness of interior surface 51 of third-indented section 50 would be about 0.15 inches, again due to overall strength characteristics of brake drum 10 and with the consideration of good foundry practice.

Figure 4:
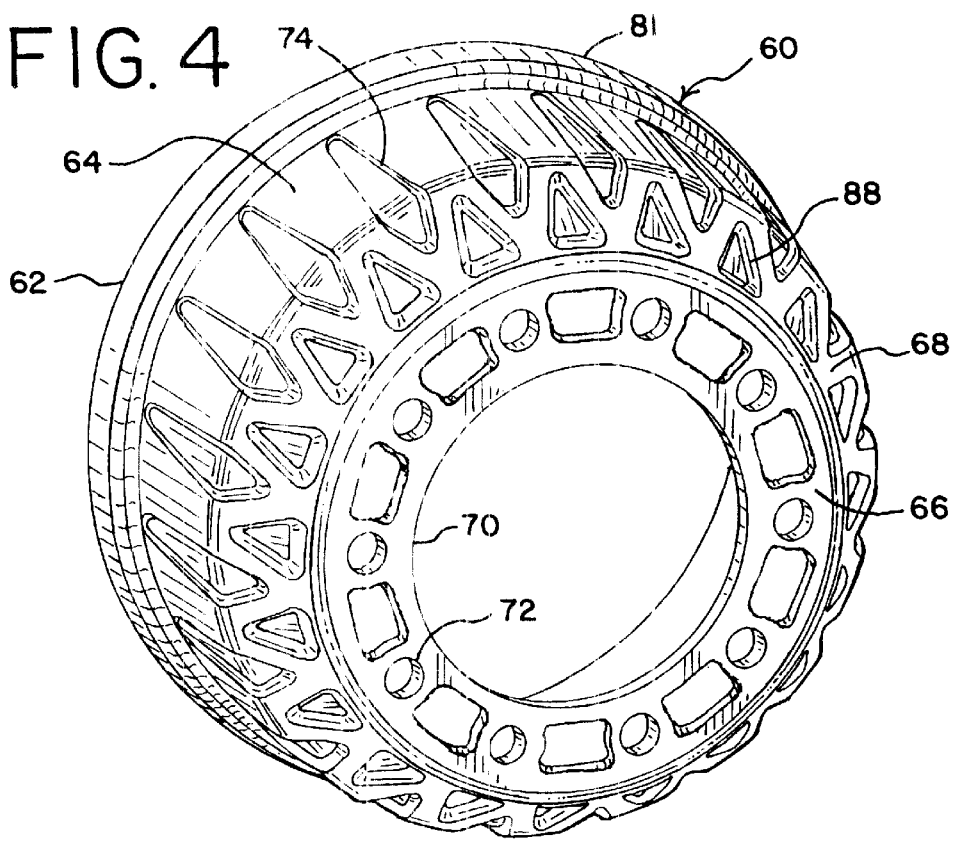
FIG. 4 is a perspective view of a second embodiment of a brake drum in accordance with the present invention.
Figure 5:
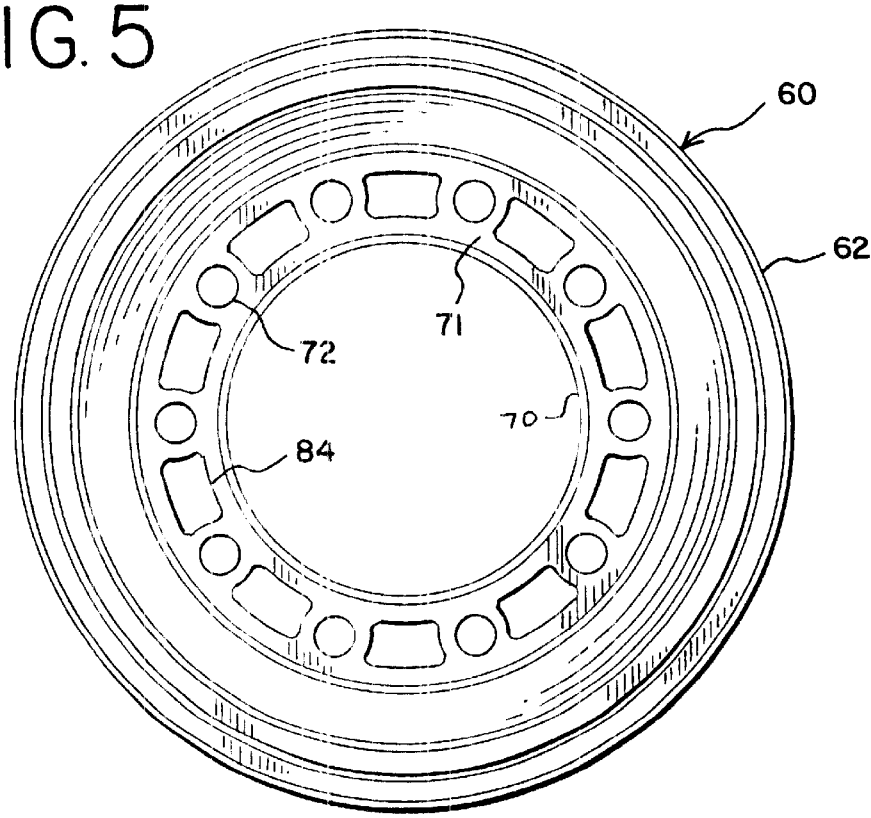
FIG. 5 is an end view of the open end of the brake drum of FIG. 4.

Referring to FIGS. 4 and 5, a brake drum in accordance with the second embodiment of the present invention is shown generally at 60. Brake drum 60 is a generally cylindrical structure, having a circular open end 62 and a nearly cylindrical braking section 64 extending from open end 62 to hub end 66. Hub end 66 is seen to comprise a generally flat inner surface 71 that terminates by forming circular hub opening 70. A plurality of wheel lug openings 72 are spaced around inner surface 71 of hub end 66. Transition section 68 is seen to extend from braking section 64 to inner surface 71 of hub end 66. Braking section 64 itself is a generally cylindrical section extending at a nearly normal relation to open end 62; however, it is also understood that another embodiment of the present invention could also have the outer surface of braking section 64 extending at a slightly less than normal angle to open end 62.

The finishing operations of brake drum 60 would be much as that described above for brake drum 10. Such finishing would include a static balancing by the machining of squealer band 81.

It can be seen that a plurality, most typically twenty, of first-indented sections 74 are present around the circumference of braking section 64. Each of first-indented sections 74 is seen to be comprised of an elongated quadrilateral shape, similar to first-indented sections 24 described above.

A plurality of second-indented sections 88 is shown as spaced circumferentially around transition section 68. It is seen that each of second-indented sections 88 is similar to second-indented sections 38 described above.

A plurality of openings 84 are indicated in hub end 66, specifically through inner surface 71 of hub end 66. Each of openings 84 is generally quadrilateral in shape and is located between each of two wheel lug openings 72. It is possible to eliminate certain of openings 84, but overall balancing of brake drum 60 is an important factor in considering the placement and configuration of openings 84. It is also possible to eliminate certain of such openings 84, but the overall relationship and spacing of openings 84 about inner surface 71 of open end 62 of brake drum 60 is an important consideration with regard to balancing of brake drum 60. Each of openings 84 could be spaced to within about 0.38 inches of each wheel lug opening 72, keeping a certain spacing for the overall strength of brake drum 60 and in consideration of good foundry practice.

Figure 6:
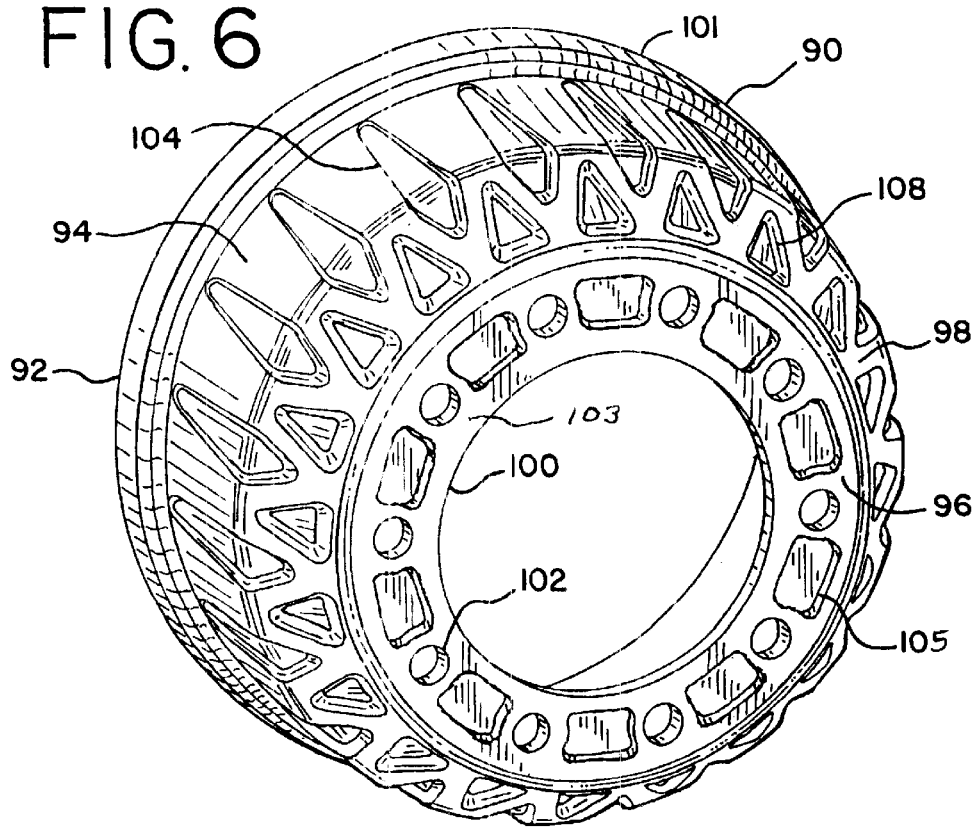
FIG. 6 is a perspective view of a third embodiment of a brake drum in accordance with the present invention.
Figure 7:
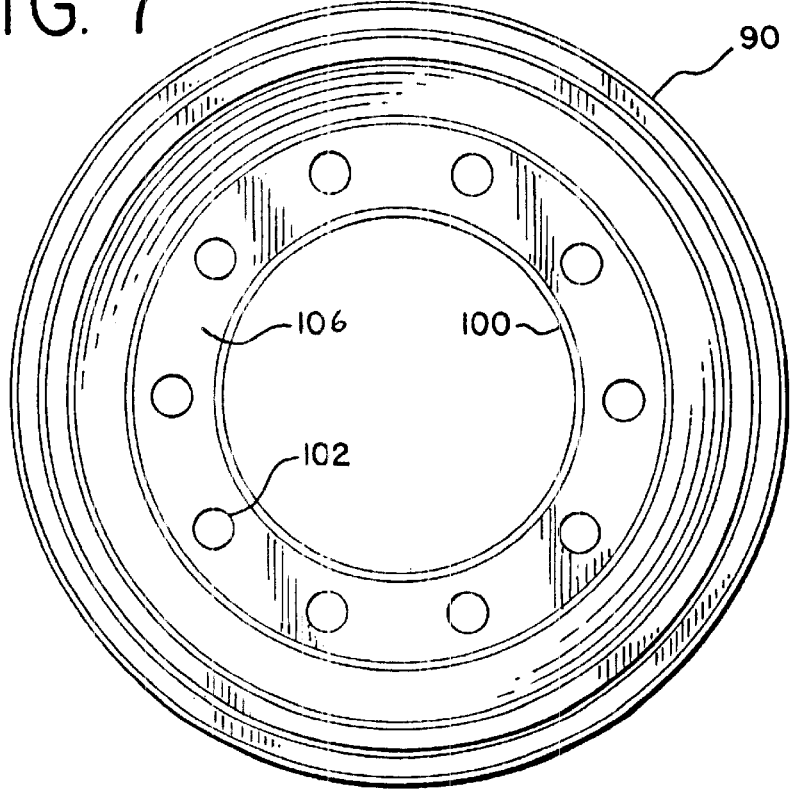
FIG. 7 is an end view of the open end of the brake drum of FIG. 6.

Referring now to FIGS. 6 and 7, a brake drum in accordance with the third embodiment of the present invention is shown generally at 90. Brake drum 90 is a generally cylindrical structure, having a circular open end 92 and a nearly cylindrical braking section 94 extending from open end 92 to hub end 96. Hub end 96 is seen to comprise a generally flat inner surface 106 that terminates by forming circular hub opening 100. A plurality of wheel lug openings 102 are spaced around inner surface 106 of hub end 96. Transition section 98 is seen to extend from braking section 94 to inner surface 106 of hub end 96. Braking section 94 itself is a generally cylindrical section extending at a nearly normal relation to open end 92; however, it is also understood that a preferred embodiment of the present invention could also have braking section 94 extending at a slightly less than normal angle to open end 92.

The finishing operations of brake drum 90 would be much as that described above for brake drum 10. Such finishing would include a static balancing by machining of squealer balancing band 101.

It can be seen that a plurality, most typically twenty, of first-indented sections 104 are present around the circumference of the outer surface of braking section 94. Each of first-indented sections 104 is seen to be comprised of an elongated quadrilateral shape, similar to first-indented section 24 described above.

A plurality of second-indented sections 108 is shown as spaced circumferentially around the outer surface of transition section 98. It is seen that each of second-indented sections 108 is similar to second-indented sections 38 described above.

A plurality of third-indented sections 105 are indicated in hub end 96, specifically on the outer surface 103 of hub end 96. Each of third-indented sections 105 is generally quadrilateral in shape similar to third-indented sections 50 described above and is located between each of two wheel lug openings 102. It is possible to eliminate certain of third-indented sections 105, but overall balancing of brake drum 90 is an important factor in considering the placement and configuration of third-indented sections 105. Each of third-indented sections 105 could be spaced to within about 0.38 inches of each wheel lug opening 102, keeping a certain spacing for the overall strength of brake drum 90 and in consideration of good foundry practice.

What is claimed is:

1. A brake drum comprising
a cylindrical drum structure having an open end and a hub end, said hub end being partially closed to form a hub receiving opening in a radially central portion of said hub end,
a braking section extending generally transversely from said open end toward said hub end,
a transition section extending from said braking section to an intersection with said hub end,
a plurality of first-indented sections on an outer surface of said braking section, each of said indented sections extending from said braking section onto said transition section,
a plurality of second-indented sections on an outer surface of said transition section, and a plurality of wheel lug openings in said hub end.

2. The brake drum of claim 1
further comprising a plurality of third-indented sections on an inner surface of said hub end.

3. The brake drum of claim 2
wherein each of said third-indented sections is located between two of said wheel lug openings.

4. The brake drum of claim 2
wherein each of said third-indented sections is generally quadrilateral in shape.

5. The brake drum of claim 2
wherein each of said third-indented sections has a thickness of about 0.15 inch.

6. The brake drum of claim 1
further comprising a plurality of third-indented sections on an outer surface of said hub end.

7. The brake drum of claim 1
further comprising a plurality of hub end openings in said hub end, each of said hub end openings located between two of said wheel lug openings.

8. The brake drum of claim 1
wherein each of said first-indented sections is of an elongated quadrilateral shape, with a first end of each of said first indented sections extending near said open end, with a first two sides of each said first-indented sections forming said first end and extending at an angle of between 5 and 15 degrees with respect to each other.

9. The brake drum of claim 8
wherein a second end of each of said first-indented sections extends onto said transition section, with a second two sides of each of said first indented sections forming said second end and extending at an angle of between 65 and 80 degrees with respect to each other.

10. The brake drum of claim 1
wherein each of said first-indented sections has a thickness of about 0.15 inch.

11. The brake drum of claim 1
wherein each of said second-indented sections is of a generally triangular shape, with each of said second-indented sections located circumferentially between two of said first-indented sections.

12. The brake drum of claim 11
wherein each of said second-indented sections has an end formed by two sides, with said two sides extending at an angle of between 55 and 70 degrees with respect to each other.

13. The brake drum of claim 1
wherein each of said second-indented sections has a thickness of about 0.15 inch.

14. A brake drum comprising
a cylindrical drum structure having an open end and a hub end, said hub end being partially closed to form a hub receiving opening in a radially central portion of said hub end,
a braking section extending generally transversely from said open end toward said hub end, a transition section extending from said braking section to an intersection with said hub end, a plurality of first-indented sections on an outer surface of said braking section, each of said indented sections extending from said braking section onto said transition section, a plurality of second-indented sections on an outer surface of said transition section, and a plurality of wheel lug openings in said hub end, and a plurality of third-indented sections on an inner surface of said hub end.

15. A brake drum comprising a circular open end, a hub end, a generally cylindrical braking section joining said open end and said hub end, a plurality of first-indented sections on an outer surface of said braking section, and a plurality of second-indented sections on said outer surface of said braking section, wherein each of said first-indented sections has a first portion extending toward said open end and a second portion extending toward said hub end, and wherein each of said first-indented sections varies in thickness from about 0.75 inch at its first portion to about 0.15 inch at its second portion.

16. A brake drum comprising a circular open end, a hub end, a generally cylindrical braking section joining said open end and said hub end, a plurality of first-indented sections on an outer surface of said braking section, and a plurality of second-indented sections on said outer surface of said braking section, further comprising a transition section extending from said braking section to an intersection with said hub end, wherein each of said second-indented sections are located on an outer surface of said transition section.

17. A brake drum comprising a circular open end, a hub end, a generally cylindrical braking section joining said open end and said hub end, a plurality of first-indented sections on an outer surface of said braking section, and a plurality of second-indented sections on said outer surface of said braking section, wherein said hub end comprises a generally flat, circular section forming a circular, radially centrally located hub opening, and further comprising a plurality of third-indented sections on an inner surface of said hub end circular section.

18. A brake drum comprising a circular open end, a hub end, a generally cylindrical braking section joining said open end and said hub end, a plurality of first-indented sections on an outer surface of said braking section, and a plurality of second-indented sections on said outer surface of said braking section, further comprising a plurality of wheel lug openings in said hub end circular sections, and wherein each of said third-indented sections is located between two of said wheel lug openings.

19. A brake drum comprising a circular open end, a hub end, a generally cylindrical braking section joining said open end and said hub end, a plurality of first-indented sections on an outer surface of said braking section, and a plurality of second-indented sections on said outer surface of said braking section, wherein each of said first-indented sections is of an elongated quadrilateral shape, with a first end of each of said first-indented sections extending near said open end, with a first two sides of each of said first-indented sections forming said first end and extending at an angle of between 5 and 15 degrees with respect to each other.

20. The brake drum of claim 19 wherein a second end of each of said first-indented surfaces extends onto said transition section, with a second two sides of each of said first-indented sections forming said second end and extending at an angle of between 65 and 80 degrees with respect to each other.

21. A brake drum comprising a circular open end, a hub end, a generally cylindrical braking section joining said open end and said hub end, a plurality of first-indented sections on an outer surface of said braking section, and a plurality of second-indented sections on said outer surface of said braking section, further comprising a transition section extending from said braking section to an intersection with said hub end, wherein each of said second-indented sections are located on an outer surface of said transition section, wherein each of said second-indented sections is of a triangular shape, with each of said second-indented sections located circumferentially between two of said first-indented sections.

22. The brake drum of claim 21 wherein each of said second-indented sections has an end formed by two sides, with said two sides extending at an angle of between 55 and 70 degrees with respect to each other.

* * * * *